United States Patent
Al-Anazi et al.

(10) Patent No.: US 12,247,862 B2
(45) Date of Patent: Mar. 11, 2025

(54) VALIDATING A PORTABLE TESTING UNIT

(71) Applicant: Saudi Arabian Oil Company, Dhahran (SA)

(72) Inventors: Ammal F. Al-Anazi, Dammam (SA); Wenrong Mei, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 541 days.

(21) Appl. No.: 17/683,006

(22) Filed: Feb. 28, 2022

(65) Prior Publication Data

US 2023/0273063 A1    Aug. 31, 2023

(51) Int. Cl.
*G01F 25/10* (2022.01)
*G01F 1/84* (2006.01)
*G01F 15/063* (2022.01)

(52) U.S. Cl.
CPC ............... *G01F 25/10* (2022.01); *G01F 1/84* (2013.01); *G01F 15/063* (2013.01)

(58) Field of Classification Search
CPC ........... G01F 25/10; G01F 1/84; G01F 15/063
USPC ......................................................... 73/1.35
See application file for complete search history.

(56) References Cited

U.S. PATENT DOCUMENTS

2021/0102831 A1*  4/2021  Ahmad ................... G01F 25/10

OTHER PUBLICATIONS

Al-Mubarak, "A new method in calculating water cut and oil and water volumes using coriolis meter," SPE Annual Technical Conference and Exhibition, Oct. 1997, 3 pages.
Al-Mutairi et al., "Enhancing Well Testing Performance by Installing a Reliable Water Cut Meter Along with Coriolis Flowmeter," SPE/DGS Saudi Arabia Section Technical Symposium and Exhibition, May 2011, 10 pages.
Al-Saqabi et al., "Evaluation of coriolis meters and gas flow computers for well testing," 11th Abu Dhabi International Petroleum Exhibition and Conference, Oct. 2004, 5 pages.
Ihe et al., "Enhancing NAG well surveillance by realtime measurement of condensate-gas ratio CGR using coriolis meter," Nigera Annual Conference and Exhibition, Aug. 2020, 9 pages.
Mei et al., "Innovative Flow Calculation to improve the accuracy of Coriolis meters," International Petroleum Technology Conference, Kuala Lumpur, Dec. 2014, 19 pages.
Yeung et al., "Coriolis meter in two phase flows," Multiphase Production Technology, 2005, 12:345-354, 10 pages.

* cited by examiner

*Primary Examiner* — Nathaniel T Woodward
(74) *Attorney, Agent, or Firm* — Fish & Richardson P.C.

(57) ABSTRACT

Disclosed are methods, systems, and computer-readable medium to perform operations including: calculating a total gas flow rate in a testing trap, where the total gas flow rate includes a first gas flow rate in a liquid leg of the testing trap and a second gas flow rate in a gas leg of the testing trap; calculating a total oil flow rate in the testing trap, where the total oil flow rate includes a first oil flow rate in the liquid leg and a second oil rate in the gas leg; comparing the total gas flow rate and the total oil flow rate to a measured gas flow rate and a measured oil flow rate respectively, where the measured gas flow rate and the measured gas flow rate are measured by a multiphase flow meter; and determining, based on the comparison, whether the multiphase flow meter is calibrated.

20 Claims, 4 Drawing Sheets

VALIDATING A PORTABLE TESTING UNIT

TECHNICAL FIELD

This disclosure relates to methods and systems for validating a portable testing unit.

BACKGROUND

In the oil and gas industry, a portable testing trap is a portable device that includes a 2- or 3-phase separator. The portable testing trap is placed in a flow of a fluid produced from a reservoir. The portable testing trap receives the fluid and separates it into liquid and gas in the case of a 2-phase separator, and separates it into water, oil, and gas in the case of a 3-phase separator. The portable testing trap includes measuring devices that can measure the flow (or other properties) of each of the separated phases. The measurements made by the portable testing trap can be used to validate the measurements of fixed equipment, such as multiphase flow meters (MPFM).

SUMMARY

Portable testing traps, however, face difficulties when the input flow rates are too great to have adequate separation time for the gas to escape from the liquid in the phase separator. Several problems may result in this scenario. In one problem, called gas carry-under, gas is not completely separated from the liquid and some amount of free gas is carried by the liquid. As a result, the Coriolis meter on the liquid leg of a portable testing trap produces a mass flow measurement of the liquid with some "uncertainties." In another problem, called liquid carry-over, some liquid is carried into the gas leg. As a result, the Coriolis meter on the gas leg of a portable testing trap gives a density measurement of the gas with some discrepancies. In existing systems, these problems are partially addressed by adjusting the liquid level inside the separator. However, adjusting the liquid level is a highly specialized art requiring extensive training and does not completely resolve the problems.

This disclosure describes methods and systems for enhancing the accuracy of a reference portable test unit. In some embodiments, the enhancement can be implemented, for example, before the reference portable test unit is used to validate other types of measurements, such as measurements by MPFMs. More specifically, the enhancement involves calculating volumetric flow rates from both the gas and oil flow measuring devices of the reference portable test using an enhanced flow calculation. The enhanced flow calculation involves calculating volumetric flowrates for gas, oil, and water while accounting for gas carry-under and oil carry-over. The enhanced flow calculation uses the properties of the reservoir fluid under the testing pressure and temperature conditions (e.g., real pressure-volume-temperature [PVT] properties of the fluid). The calculated volumetric flowrates can then be used to validate the volumetric rates from another testing unit (e.g., a fixed testing unit).

Aspects of the subject matter described in this specification may be embodied in methods that include operations for validating a portable testing unit equipped with Coriolis meters. In one embodiment, the operations involve: calculating a total gas flow rate in a testing trap, where the total gas flow rate includes a first gas flow rate in a liquid leg of the testing trap and a second gas flow rate in a gas leg of the testing trap; calculating a total oil flow rate in the testing trap, where the total oil flow rate includes a first oil flow rate in the liquid leg of the testing trap and a second oil rate in the gas leg of the testing trap; comparing the total gas flow rate and the total oil flow rate to a measured gas flow rate and a measured oil flow rate respectively, where the measured gas flow rate and the measured gas flow rate are measured by a multiphase flow meter; and determining, based on the comparison, whether the multiphase flow meter is calibrated.

Other versions include corresponding systems, apparatus, and computer programs to perform the actions of methods defined by instructions encoded on computer readable storage devices. These and other versions may optionally include one or more of the following features.

In some implementations, the testing trap comprises a gas Coriolis meter and a liquid Coriolis meter.

In some implementations, the first oil flow rate is calculated using:

$$Q_{OL} = \frac{(1 - G_{Lf})(\sigma_{Lm})}{\rho_{Lm}} \times \frac{(1 - WC)}{B_o(1 - WC) + B_w(WC)},$$

where $\sigma_{Lm}$ is a mass flow rate in the liquid leg at line conditions, $\rho_{Lm}$ is a density of a liquid part at line conditions, WC is a water cut fraction at standard conditions, $B_o$ is a formation volume factor of oil, $B_w$ is a formation volume factor of water, and $G_{Lf}$ is a dimensionless gas fraction in the liquid part at line conditions.

In some implementations, the second oil flow rate is calculated using:

$$Q_{OC} = \frac{\sigma_{gm} \times (1 - G_f)}{\rho_{gm} \times B_o},$$

where $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

In some implementations, the first gas flow rate is calculated using:

$$Q_{Lfg} = \frac{G_{Lf}(\sigma_{Lm})}{\rho_{Lm} B_g},$$

where $\sigma_{Lm}$ is a mass flow rate in the liquid leg at line conditions, $\sigma_{gm}$ is a density of a liquid part at line conditions, $B_o$ is a gas formation volume factor, and $G_{Lf}$ is a dimensionless gas fraction in the liquid part at line conditions.

In some implementations, the second gas flow rate is calculated using:

$$Q_{fg} = \frac{\sigma_{gm} \times G_f}{\rho_{gm} \times B_g},$$

where $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

In some implementations, the operations further involve generating a message indicating whether the multiphase flow meter is calibrated.

In some implementations, the total gas flow rate further comprises gas dissolved gas dissolved in the oil in the testing trap.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

The subject matter described in this specification can be implemented in particular implementations so as to realize one or more of the following advantages. The disclosed systems and methods improve the testing accuracy of a reference testing unit. The disclosed systems and methods involve system setup or configuration and calculations to correct the testing discrepancy due to gas carry-under and/or oil carry-over. As such, the disclosed systems and methods achieve higher accuracy and reliability than existing solutions. Moreover, the disclosed systems have a minimum maintenance requirement for the key component of metering devices.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE DRAWINGS

Like reference numbers and designations in the various drawings indicate like elements.

DETAILED DESCRIPTION

This disclosure describes methods and systems for improving the accuracy of a reference portable test unit equipped with Coriolis meters. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

Figure 1:
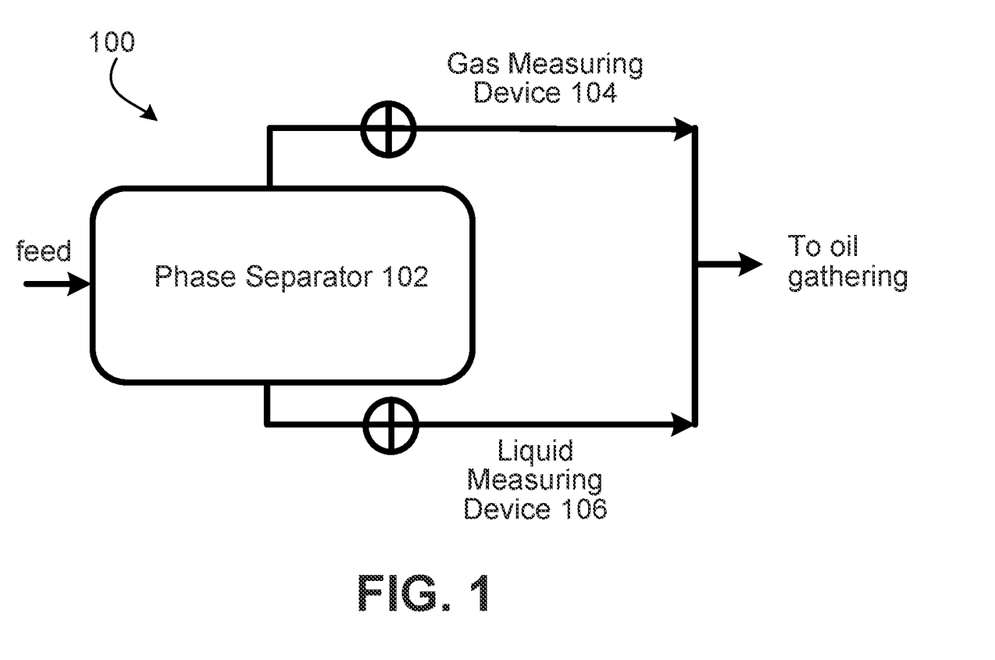
FIG. 1 illustrates a testing trap, according to some implementations of the present disclosure.

FIG. 1 illustrates a testing trap 100, according to some implementations. The testing trap 100 is configured to receive a liquid from a wellbore. The testing trap 100 separates the liquid into several phases and measures flow rates of the separated phases. The testing trap 100 includes a separator, flow control valves, and other instruments/sensors for measuring data for calculating the flow rates. Inside the separator, the fluid from the wellbore is separated into a gas and a liquid. The gas exits from one end of the separator and is measured by a gas meter (e.g., a Coriolis meter) and/or an orifice meter. The liquid exists from the other end and is measured by a liquid meter (e.g., a Coriolis meter) and/or a turbine meter. Additionally, a reliable water cut meter (e.g., a RedEye meter) is installed in the liquid leg to measure the water cut (e.g., continuously or periodically).

The gas rate within the testing trap 100 can be controlled by a pressure control valve (PCV), and the liquid rate can be controlled by a liquid control valve (LCV). The opening of the LCV can be controlled by an output from a liquid level transmitter. And the opening of the PCV can be controlled by a pre-assigned pressure value (e.g., set by a testing operator at the beginning of the testing process). This pressure value enables the wellbore liquid to flow through the portable separator, where the liquid is separated into phases and measured. Once the separated phases exit the separator, the phases join back together before being routed to the designated gas-oil separation plant (GOSP). In some examples, the LCV, liquid level transmitter, PCV, and pressure gauge are linked together to form a logic loop. The logic controller, e.g., a computer system (e.g., shown in FIG. 4), can control these components to achieve certain pre-set values, such as liquid level and pressure in the separator.

As shown in FIG. 1, the testing trap 100 includes a phase separator 102. The phase separator 102 can be 2-phase or a 3-phase separator. The phase separator 102 receives the wellbore fluid and separates the gas from the liquid. In scenarios where the phase separator 102 is a 2-phase separator, the phase separator 102 separates the fluid into a liquid (e.g., oil and water) and a gas. And in scenarios where the phase separator 102 is a 3-phase separator, the phase separator 102 separates the fluid into water, oil, and a gas. In this disclosure, a 2-phase separator is used as it is the most common arrangement. However, a 3-phase separator can alternatively be used.

In the testing trap 100, the gas exits the phase separator 102 from one end and is routed to a portion of the testing trap 100 referred to as the gas leg. In the gas leg, the testing trap 100 includes a gas measuring device 104 that measures the gas's mass flow and density. The gas measuring device 104 can be a single-phase flow meter. The separated liquid phase exits from the other end of the phase separator 102 and is routed to a portion of the testing trap 100 referred to as the liquid leg. In the liquid leg, the testing trap 100 includes a liquid measuring device 106 that measures the liquid's mass flow and density. The liquid measuring device 106 can be a single-phase flow meter.

In some embodiments, the gas measuring device 104 and the liquid measuring device 106 are Coriolis meters. A Coriolis meter is a mechanical device that infers a mass flow rate and/or a density of a fluid traveling through a vibrating tube by sensing the force exerted on the tube. Accordingly, the gas measuring device 104 and the liquid measuring device 106 can measure the mass flow rate and/or the density of the gas phase and the liquid phase, respectively. In some embodiments, in addition to measuring the mass flow or volumetric rate of the liquid, a measurement of water cut of the separated liquid is also performed in the liquid leg. The water cut measurement can be performed manually by taking samples of the separated liquid, automatically using a water cut meter, or both. For example, this disclosure describes the water cut measurement being conducted manually by taking samples of the liquid and automatically using a reliably calibrated water cut meter (e.g., a RedEye meter).

In line with the discussion above, the measurements performed by the testing trap 100 may be inaccurate in some scenarios. One of these scenarios occurs when the input flow rates are too great for there to be adequate separation time for the gas to escape from the liquid in the phase separator 102. Another scenario occurs when the fluid level inside the 2-phase separator 102 is kept at an unsuitable level. Several problems may occur in these scenarios. In one problem, called gas carry-under, gas is not completely separated from the liquid and some amount of free gas is carried by the liquid. As a result, the liquid measuring device 106 (e.g., a Coriolis meter) inaccurately measures a mass flow and density of the liquid. In another problem, called liquid carry-over, some amount of liquid is carried over into the gas leg. In cases where oil is carried over, the problem is referred to as oil carry-over. As a result, the gas measuring device 104 (e.g., a Coriolis meter) measures a mass flow and density of the gas with some discrepancies.

In existing systems, the volumetric rates of oil and gas is directly derived from the division of mass flow rate by the measured densities without any correction, as shown by Equation [1]:

$$\text{Volumetric Rate} = \frac{\text{Mass Flow Rate}}{\text{Density of fluid or gas}} = \frac{\text{Mass per unit of time}}{\text{Mass pre unit of volume}} = \frac{\text{Volume}}{\text{Time}}. \quad [1]$$

In such existing systems, liquid carry-over and gas carry-under are partially addressed by adjusting the liquid level inside the separator. However, adjusting the liquid level is a highly specialized art requiring extensive training and, in many instances, cannot completely resolve the issues caused by liquid carry-over and gas carry-under.

To illustrate the difficulties presented by gas carry-under and liquid carry-over, consider the following example. Typically, the density of the fluid is the sum of the density of oil and the density of the water in the liquid leg. If the densities of both water and oil are known, then the water cut and the phase volumes of water and oil can be calculated, for example, using Equation [2]:

$$\text{Density of mixture} = \rho_w * WVF + \rho_0 * (1-WVF) = \rho_m \quad [2]$$

In Equation [2], $\rho_w$ is the density of water, $\rho_o$ is the density of oil, WVF is the water volume fraction, and $\rho_m$ is the density of the liquid mixture of oil and water. But when gas carry-under occurs, the measured density of fluid is actually the density of three phases: oil, water, and free gas. With a single measurement of mixture density, it is challenging to calculate the volume fraction of each of the three phases. Thus, due to gas carry-under or liquid carry-over, there is no way to validate whether the measurements made by the testing trap 100 are accurate. This is especially problematic in scenarios where the testing trap 100 is used to validate the measurements of other devices, such as multiphase flow meters (MPFMs). Another problem in the calculation of the volumetric flow rates from the Coriolis meter measurement in existing systems is that a simple approach is applied to the measured mass flow rate and density without any correction due to possible gas carry-under or oil carry-over.

This disclosure describes methods and systems for enhancing the accuracy of a reference portable test unit. In some embodiments, the enhancement can be implemented, for example, before the reference portable test unit is used to validate other types of measurements, such as measurements by MPFMs. More specifically, the enhancement involves calculating volumetric flow rates from both the gas and oil flow measuring devices of the reference portable test using an enhanced flow calculation. The enhanced flow calculation involves calculating volumetric flowrates for gas, oil, and water while accounting for gas carry-under and oil carry-over. The enhanced flow calculation uses the properties of the reservoir fluid under the testing pressure and temperature conditions (e.g., real pressure-volume-temperature [PVT] properties of the fluid). The calculated volumetric flowrates can then be used to validate the volumetric rates from another testing unit (e.g., a fixed testing unit).

Figure 2:
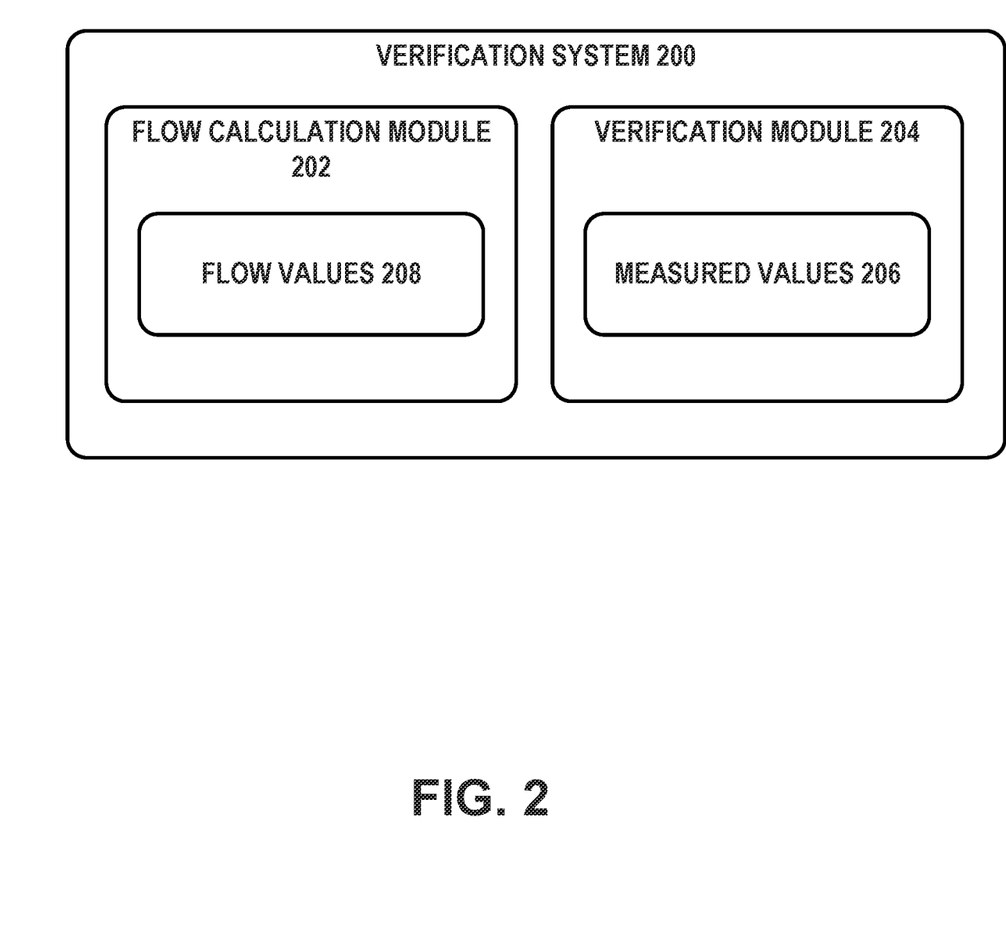
FIG. 2 illustrates a block diagram of an example verification system, according to some implementations of the present disclosure.

FIG. 2 illustrates a verification system 200, according to some implementations. In some embodiments, the verification system 200 is used to cross-check the validity of the measurements of other devices. The verification system 200 may be a part of or used in conjunction with a testing trap (e.g., testing trap 100 of FIG. 1). The verification system 200 may be implemented using a computing system, such as the computer system 400 of FIG. 4. As shown in FIG. 2, the verification system 200 includes a flow calculation module 202 and a verification module 204. These systems may be implemented on the same computing system or on separate computing systems. The flow calculation module 202 is configured to perform an enhanced flow calculation for a portable testing unit. The results from the enhanced flow calculation can be used by the verification module 204 to verify measurements 206 of a second device. For example, the second device may be an MPFM connected upstream in series with the testing trap.

In some embodiments, the flow calculation module 202 receives input data that is used in the enhanced flow calculation. In some examples, the input data includes measurements from the testing trap. In particular, the measurements can be from one or more Coriolis meters and/or a water cut meter of the testing trap. The measurements can include: (i) a measured mass flow rate of liquid at separator conditions (also called "line conditions") by a Coriolis meter ($\rho_{lm}$) in pounds/min (lb/min), (ii) a measured mass flow rate of gas at separator conditions by a Coriolis meter ($\sigma_{gm}$) in lb/min, (iii) a measured density of liquid at separator conditions by a Coriolis meter ($\rho_{lm}$) in pounds per cubic feet (PCF), (iv) a measured density of gas at separator conditions by a Coriolis meter ($\rho_{gm}$) in PCF, and/or (v) a water cut reading (dimensionless).

In some embodiments, the input data can additionally include data related to oil, water, and gas. The data can include a specific gravity of gas ($\gamma_g$), a specific gravity of oil ($\gamma_{API}$), and/or a specific gravity of water ($\gamma_w$). The specific gravity is a dimensionless value. Additionally and/or alternatively, the input data can include actual PVT properties of oil, water, and gas. The flow calculation module 202 may receive the PVT properties from another computing system or by user input. The PVT properties can include: (i) an oil formation volume factor ($B_o$) in reservoir volume over standard volume (rbbl/STB), (ii) a water formation volume factor ($B_w$) in rbbl/STB, (iii) a gas formation volume factor ($B_g$) in reservoir cubic feet over standard cubic feet ([res cubic feet]/SCF), and/or (iv) a solution gas/oil ratio ($R_s$) in SCF/STB.

As described in more detail below, the flow calculation module 202 uses the enhanced flow calculation and the input data to calculate volumetric rates of water ($Q_w$), oil ($Q_o$), and gas ($Q_g$). The oil and water flow rates have units of STB per day, and the gas flow rate has units of thousand standard cubic feet per day (MSCF) per day. Further, the flow calculation module 202 calculates a water cut and/or a gas-oil ratio (GOR) using the volumetric rates. As also described below, the water cut can be calculated using Equation [8] and the GOR can be calculated using Equation [19]. Specifically, the GOR is calculated as a gas flow rate at standard conditions divided by an oil flow rate at standard conditions. Furthermore, the flow calculation module 202 calculates a total mass flow rate ($\sigma_T$) as a sum of $\sigma_{im}$ (the mass flow rate from a Coriolis meter in the liquid leg) and $\sigma_{gm}$ (the mass flow rate from a Coriolis meter in the gas leg), and a liquid flow rate ($Q_L$) as the sum of an oil flow rate ($Q_o$) and a water flow rate ($Q_w$) at standard conditions.

In some embodiments, the enhanced flow calculation is based on a material balance check. The material balance check is based on the principle that the mass flow into a system (e.g., a system with gas separation such as a portable testing trap consisting of gas measuring device 104 and liquid measuring device 106, or a system without separation such as MPFM) is equal to the mass flow out of the system. This principle is shown by Equation [3]:

$$\text{Mass Flow}_{in} = \text{Mass Flow}_{out}. \quad [3]$$

From this principle, it is deduced that the measured mass flow rate in the portable testing trap should be equal (or substantially similar, e.g., within a threshold) to the mass flow rate calculated from volumetric rates of another testing unit, as shown by Equation [4]:

$$\text{Mass Flow Rate}_{measured} \approx \text{Mass Flow Rate}_{calculated\ from\ volumetric\ rates}. \quad [4]$$

In some embodiments, the flow calculation module 202 is configured to calculate the mass flow from the volumetric rate using Equation [5]:

$$\text{Mass Flow}_{calculated\ from\ volumetric\ rates} = \text{Mass Flow Rate}_{oil} + \text{Mass Flow Rate}_{water} + \text{Mass Flow Rate}_{Gas}, \quad [5]$$

where Mass Flow Rate$_{oil} = Q_o \times \rho_o$,
Mass Flow Rate$_{water} = Q_w \times \rho_w$, and
Mass Flow Rate$_{gas} = Q_g \times \rho_g$.

In Equation [5], $Q_o$, $Q_w$, and $Q_g$ are the volumetric rates of oil, water, and gas, respectively. Further, $\rho_o$, $\rho_w$, and $\rho_g$ are the densities of oil, water, and gas, respectively. The units for densities are pounds per cubic feet.

In some embodiments, the enhanced flow calculation involves the computation of volumetric rates of oil, water, and/or gas. Starting with the gas volumetric rate, $Q_g$, the rate can be calculated as a sum of the gas in the liquid and gas legs. The calculation involves a dimensionless gas fraction in the liquid part at line conditions, $G_{Lf}$, which is calculated using Equation [6] as:

$$G_{Lf} = \frac{(\rho_{Ll} - \rho_{Lm})}{(\rho_{Ll} - \rho_{Lg})}. \quad [6]$$

As shown by Equation [6], $G_{Lf}$ is the gas volume divided by the total volume of all possible phases in the liquid leg of a separator. In Equation [6], $\rho_{Ll}$ is the density of the "pure" liquid part (that is, oil and water only) at line conditions in PCF, $\rho_{Lm}$ is the measured density of the liquid part in PCF, and $\rho_{Lg}$ is the density of the gas at line conditions in PCF, which is carried under. In an example, $\rho_{Ll}$ is calculated using Equation [7]:

$$\rho_{Ll} = \frac{B_o(1-WC)\rho_{Lo}}{B_o(1-WC)+B_w(WC)} + \frac{B_w(WC)\rho_{Lw}}{B_o(1-WC)+B_w(WC)}. \quad [7]$$

In Equation [7], $\rho_{Lo}$ is the density of the oil part at line conditions in PCF, $\rho_{Lw}$ is the density of the liquid part at line conditions in PCF, WC is a water cut fraction at standard conditions that is measured by a water cut meter, $B_o$ is the formation volume factor of oil, and $B_w$ is the formation volume factor of water. Note that $\rho_{Lm}$ is a measured variable, while $\rho_{Lg}$, $B_o$ and $\rho_{Lo}$ are from PVT properties of crude oil, $\rho_{Lw}$ and $B_w$ are calculated from correlation, and $\rho_{Ll}$ and $G_{Lf}$ are intermediate variables. It is assumed that the water cut represents a standard conditions water cut. Thus, the water fraction or water cut can be computed by Equation [8]:

$$WC = \frac{Q_w}{Q_w + Q_o}. \quad [8]$$

In an example, the volumetric rates of oil and water in the liquid leg, $Q_{OL}$ and $Q_w$, are calculated using Equations [9] and [10], respectively:

$$Q_{OL} = \frac{(1-G_{Lf})(\sigma_{Lm})}{\rho_{Lm}} \times \frac{(1-WC)}{B_o(1-WC)+B_w(WC)}, \quad [9]$$

$$Q_w = \frac{(1-G_{Lf})(\sigma_{Lm})}{\rho_{Lm}} \times \frac{(WC)}{B_o(1-WC)+B_w(WC)}. \quad [10]$$

Both the volumetric rates of oil and water in the liquid leg have units of STB per day. In Equations [9] and [10], $\sigma_{Lm}$ is the mass flow rate in the liquid leg at line conditions and $\rho_{Lm}$ is the density of the liquid part at line conditions. $\sigma_{Lm}$ and $\rho_{Lm}$ are the liquid mass flow rate and density measured by the Coriolis meter.

In some embodiments, the free gas in the liquid leg at standard conditions, $Q_{Lfg}$, is calculated using Equation [11]:

$$Q_{Lfg} = \frac{G_{Lf}(\sigma_{Lm})}{\rho_{Lm}B_g}. \quad [11]$$

In Equation [11], $Q_{Lfg}$ has units of MSCF per day. Further, $B_g$ is the formation volume factor of gas. As stated above the gas volumetric rate, $Q_g$, the rate can be calculated as a sum of the gas in the liquid and gas legs. This is shown by Equation [12]:

$$Q_9 = Q_{fg} + Q_{Lfg} + \text{gas dissolved in the oil}. \quad [12]$$

In an example, the free gas in the gas leg, $Q_{fg}$, is calculated using Equation [13]:

$$Q_{fg} = \frac{\sigma_{gm} \times G_f}{\rho_{gm} \times B_g}. \quad [13]$$

In Equation [13], $Q_{fg}$ has units of MSCF per day. Further, $\sigma_{gm}$ is the mass flow rate measured by the Coriolis meter at the gas leg, $\rho_{gm}$ is the density measured by the Coriolis meter at the gas leg, and $G_f$, gas fraction, is a user defined variable. In an example, $G_f$ is calculated using Equation [14]:

$$G_f = \frac{(\rho_{gm} - \rho_0)}{(\rho_g - \rho_0)}. \quad [14]$$

Using Equations [13]-[14], Equation [12] can be rewritten as:

$$Q_g = Q_{fg} + Q_{Lfg} + R_s Q_o = \quad [15]$$
$$\frac{G_f \times \sigma_{gm} \times 23.0676}{\rho_{gm} \times B_g} + \frac{G_{Lf} \times \sigma_{Lm} \times 23.0676}{\rho_{Lm} \times B_g} + R_s Q_o.$$

In Equation [15], $R_s$ is solution gas/oil ratio in SCF/STB and $Q_o$ is an oil volumetric rate.

Turning to the oil volumetric rate, $Q_o$, the rate can be calculated as a sum of the oil in the liquid leg and gas leg (i.e., carried-over oil), as shown by Equation [16]:

$$Q_o = Q_{oL} + Q_{oC}. \quad [16]$$

In an example, the oil in the liquid leg is calculated using Equation [9], and carried over oil is calculated using Equation [17]:

$$Q_{OC} = \frac{\sigma_{gm} \times (1 - G_f)}{\rho_{gm} \times B_o}. \quad [17]$$

In Equation [17], $Q_{oc}$ has units of STB per day. Using Equations [9] and [17], Equation [16] can be rewritten as:

$$Q_O = \frac{(1 - G_{Lf})(\sigma_{Lm})}{\rho_{Lm}} \times \frac{(1 - WC)}{B_o(1 - WC) + B_w(WC)} + \frac{\sigma_{gm} \times (1 - G_f)}{\rho_{gm} \times B_o}. \quad [18]$$

Note that in the equations above, $B_o$, $B_w$, $B_g$ are real PVT properties, which are fluid-dependent. Therefore, the enhanced flow calculation reflects actual properties of the fluid.

In some embodiments, the flow calculation module 202 may additionally and/or alternatively calculate a produced gas-oil-ratio (GOR). In an example, the PVT GOR can be calculated using Equations [19]-[20]:

$$GOR = \frac{Total\ Gas\ Rate_{standard\ conditions}}{Total\ Oil\ Rate_{standard\ conditions}} = \frac{Q_g}{Q_o} = \frac{Q_{fg} + Q_{Lfg}}{Q_o} + R_s, \quad [19]$$

$$GOR = \frac{G_f \times \sigma_{gm} \times 23.0676}{\rho_{gm} \times B_g \times Q_o} + \frac{G_{Lf} \times \sigma_{Lm} \times 23.0676}{\rho_{Lm} \times B_g} + R_s. \quad [20]$$

In some embodiments, the verification module 204 uses flow values 208 to verify measurements 206 of a second device. The measurements 206 of the second device include: (i) measured volumetric rates ($Q_{o2}$, $Q_{w2}$, $Q_{g2}$), a measured GOR ($GOR_2$), and measured water cut ($WCut_2$). The measured $GOR_2$ can be calculated as $$\left(\frac{Q_{g2}}{Q_{o2}}\right).$$

The mass flow rate of a phase is equal to the density of the phase at standard conditions multiplied by the volumetric rate. The density of a phase at standard conditions is equal to the specific gravity multiplied by the density of its reference material at standard conditions according to the definition of the specific gravity. Additionally and/or alternatively, the verification module 204 calculates a total mass flow fate, $\sigma_{T2}$, of the second device. In an example, $\sigma_{T2}$ is calculated using Equation [21]:

$$\sigma_{T2} = 350.16 \gamma_o Q_{o2} + 350.16 \gamma_w Q_{w2} + 0.076335 \gamma_g Q_{g2}. \quad [21]$$

The $\gamma_o$ used in Equation [21] can be calculated using Equation [22]:

$$\gamma_o = \frac{141.5}{(131.5 + \gamma_{API})}. \quad [22]$$

In one example, the verification module 204 compares the total mass flow rate from the testing trap with the total mass flow rate calculated from the second device. In another example, the verification module 204 compares the liquid flow rate, water cut, and/or the GOR from the testing trap and those from the second device. In yet another example, the verification module 204 compares the oil rate, the water rate, and/or the gas rate from the testing trap and those values from the second device.

In one example, the verification module 204 compares the measurements 206 to the flow values 208. If the measurements 206 are within a threshold value of the flow values 208, then the verification module 204 determines that the other device is properly calibrated. Further, the verification module 204 may perform an action based on the determination. However, if the measurements 206 are not within a threshold value of the flow values 208, then the verification module 204 determines that the other device is not properly calibrated. Further, the verification module 204 may perform an action based on the determination. As an example, the verification module 204 may output a notification indicating that that the second device is not properly calibrated. The notification may be output on a graphical user interface (GUI). The notification may be a sensory notification (e.g., audio, haptic, and/or visual) on a user device.

In some embodiments, the verification module 204 compares the calculated GOR (e.g., based on PVT analysis) to a produced GOR in order to verify the measurements 206. In one example, the GOR is calculated in scenarios where the reservoir is undersaturated and the oil bubble point pressure is low enough such that the liberation of dissolved gas occurs nearly at surface. That is, when liberated gas occurs nearly at the surface locations closer to the portable testing unit (e.g., the bubble point pressure of the produced crude oil is low), a produced GOR compared to PVT GOR can be used as a check to validate the measurements 206. In an example, the verification module 204 performs comparison of GOR from both testing trap and MPFM versus GOR from PVT analysis for low bubble point pressure oils.

Figure 3:
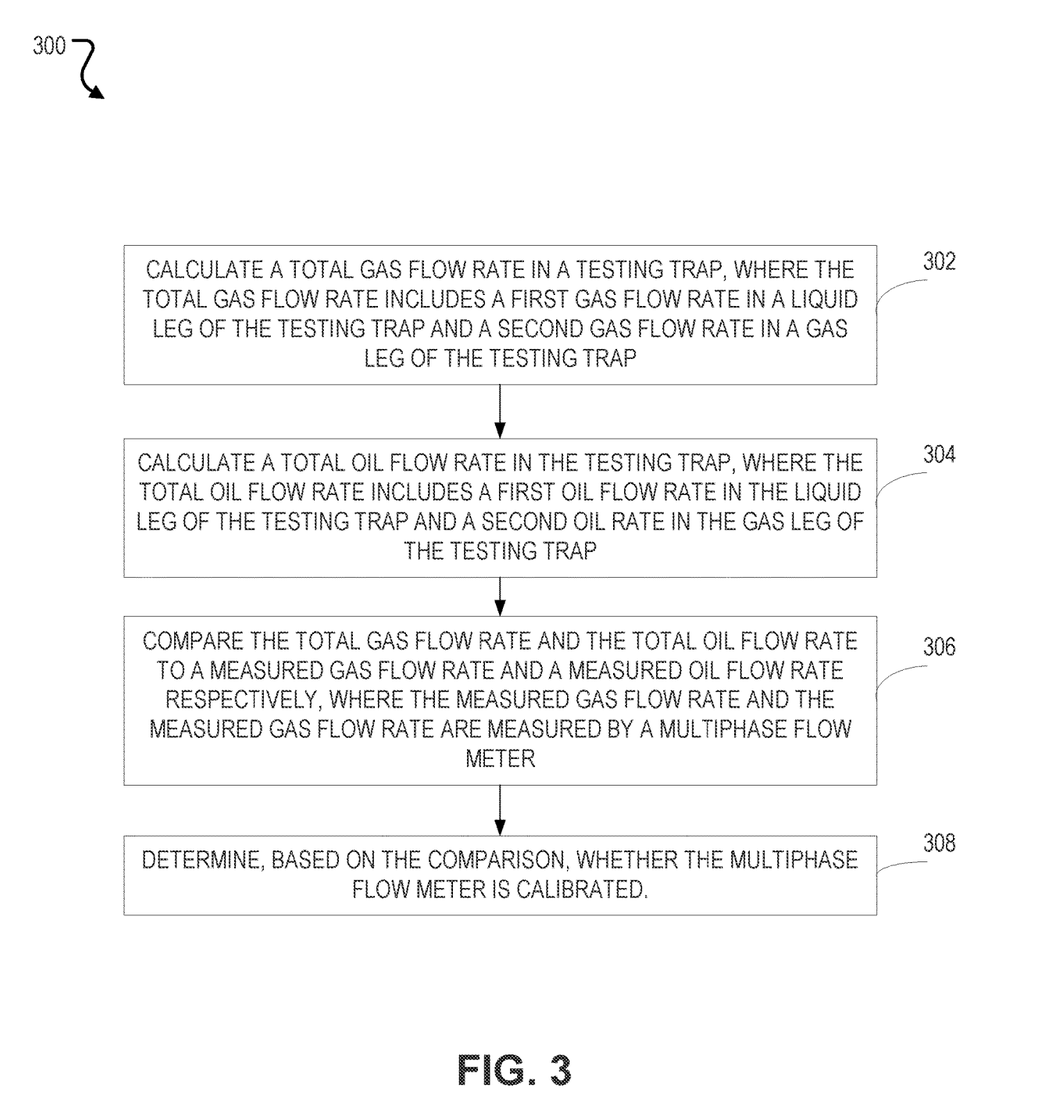
FIG. 3 illustrates a flowchart of an example method, according to some implementations of the present disclosure.

FIG. 3 illustrates a flowchart of an example method 300, according to some implementations. For clarity of presentation, the description that follows generally describes method 300 in the context of the other figures in this description. For example, method 300 can be performed by the verification system 200 of FIG. 2. It will be understood that method 300 can be performed, for example, by any suitable system, environment, software, hardware, or a combination of systems, environments, software, and hardware, as appropriate. In some implementations, various steps of method 300 can be run in parallel, in combination, in loops, or in any order.

At step 302, method 300 involves calculating a total gas flow rate in a testing trap, where the total gas flow rate includes a first gas flow rate in a liquid leg of the testing trap and a second gas flow rate in a gas leg of the testing trap.

At step 304, method 300 involves calculating a total oil flow rate in the testing trap, where the total oil flow rate includes a first oil flow rate in the liquid leg of the testing trap and a second oil rate in the gas leg of the testing trap.

At step 306, method 300 involves comparing the total gas flow rate and the total oil flow rate to a measured gas flow rate and a measured oil flow rate respectively, where the measured gas flow rate and the measured gas flow rate are measured by a multiphase flow meter.

At step 308, method 300 involves determining, based on the comparison, whether the multiphase flow meter is calibrated.

In some implementations, the testing trap comprises a gas Coriolis meter and a liquid Coriolis meter.

In some implementations, the first oil flow rate is calculated using:

$$Q_{OL} = \frac{(1-G_{Lf})(\sigma_{Lm})}{\rho_{Lm}} \times \frac{(1-WC)}{B_o(1-WC) + B_w(WC)},$$

where $\sigma_{Lm}$ is a mass flow rate in the liquid leg at line conditions, $\rho_{Lm}$ is a density of a liquid part at line conditions, WC is a water cut fraction at standard conditions, $B_o$ is a formation volume factor of oil, $B_w$ is a formation volume factor of water, and $G_{Lf}$ is a dimensionless gas fraction in the liquid part at line conditions.

In some implementations, the second oil flow rate is calculated using:

$$Q_{OC} = \frac{\sigma_{gm} \times (1-G_f)}{\rho_{gm} \times B_o},$$

where $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

In some implementations, the first gas flow rate is calculated using:

$$Q_{Lfg} = \frac{G_{Lf}(\sigma_{Lm})}{\rho_{Lm} B_g},$$

where $\sigma_{Lm}$ is a mass flow rate in the liquid leg at line conditions, $\sigma_{Lm}$ is a density of a liquid part at line conditions, $B_g$ is a gas formation volume factor, and $G_{Lf}$ is a dimensionless gas fraction in the liquid part at line conditions.

In some implementations, the second gas flow rate is calculated using:

$$Q_{fg} = \frac{\sigma_{gm} \times G_f}{\rho_{gm} \times B_g},$$

where $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

In some implementations, method 300 further involves generating a message indicating whether the multiphase flow meter is calibrated.

In some implementations, the total gas flow rate further comprises gas dissolved in the oil in the testing trap.

Figure 4:
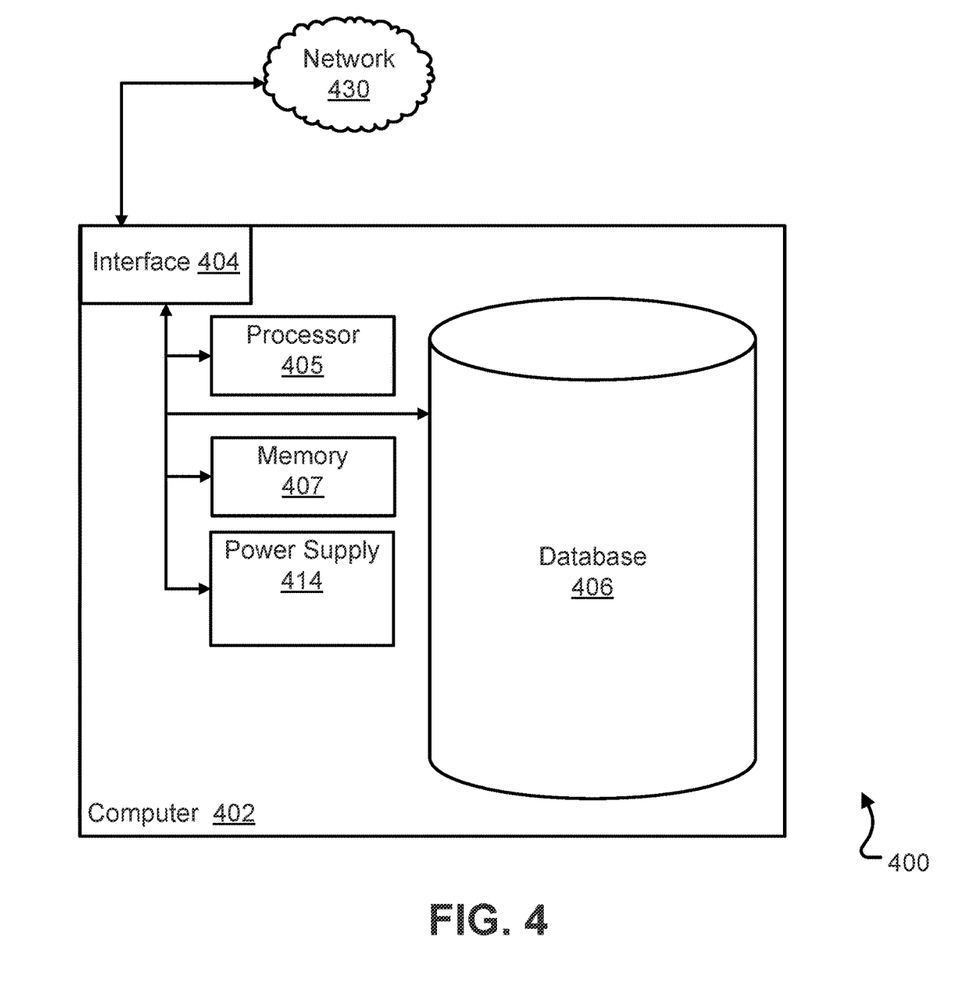
FIG. 4 is a block diagram of an example computer system, according to some implementations of the present disclosure.

FIG. 4 is a block diagram of an example computer system 400 that can be used to provide computational functionalities associated with described algorithms, methods, functions, processes, flows, and procedures described in the present disclosure, according to some implementations of the present disclosure. In some implementations, the verification system 200 can be the computer system 400, include the computer system 800, or the verification system 200 can communicate with the computer system 400.

The illustrated computer 402 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 402 can include a Smart Embedded Management Agent (SEMA), such as a built-in ADLINK SEMA 2.2, and a video sync technology, such as Quick Sync Video technology supported by ADLINK MSDK+. In some examples, the computer 402 can include the MXE-5400 Series processor-based fanless embedded computer by ADLINK, though the computer 402 can take other forms or include other components.

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus. In some implementations, any or all of the components of the computer 402, including hardware or software components, can interface with each other or the interface 404 (or a combination of both), over the system bus. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs 412.

The service layer 413 can provide software services to the computer 402 and other components (whether illustrated or not) that are communicably coupled to the computer 402. The functionality of the computer 402 can be accessible for all service consumers using this service layer 413. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 can include an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and manipulate data to perform the operations of the computer 402, including operations using algorithms, methods, functions, processes, flows, and procedures as described in the present disclosure.

The computer 402 can also include a database 406 that can hold data for the computer 402 and other components connected to the network 430 (whether illustrated or not). For example, database 406 can be an in-memory, conventional, or a database storing data consistent with the present disclosure. In some implementations, the database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

An application 408 can be an algorithmic software engine providing functionality according to particular needs, desires, or particular implementations of the computer 402 and the described functionality. For example, an application 408 can serve as one or more components, modules, or applications 408. Multiple applications 408 can be implemented on the computer 402. Each application 408 can be internal or external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system including computer 402, with each computer 402 communicating over network 430. Further, the terms "client", "user", and other appropriate terminology can be used interchangeably without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface", or "GUI", can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component such as an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method comprising:
    calculating a total gas flow rate in a testing trap, wherein the total gas flow rate comprises a first gas flow rate in a liquid leg of the testing trap and a second gas flow rate in a gas leg of the testing trap;
    calculating a total oil flow rate in the testing trap, wherein the total oil flow rate comprises a first oil flow rate in the liquid leg of the testing trap and a second oil rate in the gas leg of the testing trap;
    comparing the total gas flow rate and the total oil flow rate to a measured gas flow rate and a measured oil flow rate respectively, wherein the measured gas flow rate and the measured gas flow rate are measured by a multiphase flow meter; and
    determining, based on the comparison, whether the multiphase flow meter is calibrated.

2. The method of claim 1, wherein the testing trap comprises a gas Coriolis meter and a liquid Coriolis meter.

3. The method of claim 1, wherein the first oil flow rate is calculated using:

$$Q_{OL} = \frac{(1 - G_{Lf})(\sigma_{Lm})}{\rho_{Lm}} \times \frac{(1 - WC)}{B_o(1 - WC) + B_w(WC)},$$

wherein $\sigma_{Lm}$ is a mass flow rate in the liquid leg at line conditions, $\rho_{Lm}$ is a density of a liquid part at line conditions, WC is a water cut fraction at standard conditions, $B_o$ is a formation volume factor of oil, $B_w$ is a formation volume factor of water, and $G_{Lf}$ is a dimensionless gas fraction in the liquid part at line conditions.

4. The method of claim 1, wherein the second oil flow rate is calculated using:

$$Q_{OC} = \frac{\sigma_{gm} \times (1 - G_f)}{\rho_{gm} \times B_o},$$

wherein $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

5. The method of claim 1, wherein the first gas flow rate is calculated using:

$$Q_{Lfg} = \frac{G_{Lf}(\sigma_{Lm})}{\rho_{Lm} B_g},$$

wherein $\sigma_{Lm}$ is a mass flow rate in the liquid leg at line conditions, $\rho_{Lm}$ is a density of a liquid part at line conditions, $B_g$ is a gas formation volume factor, and $G_{Lf}$ is a dimensionless gas fraction in the liquid part at line conditions.

6. The method of claim 1, wherein the second gas flow rate is calculated using:

$$Q_{fg} = \frac{\sigma_{gm} \times G_f}{\rho_{gm} \times B_g},$$

wherein $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

7. The method of claim 1, further comprising:
generating a message indicating whether the multiphase flow meter is calibrated.

8. The method of claim 1, wherein the total gas flow rate further comprises gas dissolved in the oil in the testing trap.

9. One or more non-transitory computer-readable storage media coupled to one or more processors and having instructions stored thereon which, when executed by the one or more processors, cause the one or more processors to perform operations comprising:
calculating a total gas flow rate in a testing trap, wherein the total gas flow rate comprises a first gas flow rate in a liquid leg of the testing trap and a second gas flow rate in a gas leg of the testing trap;
calculating a total oil flow rate in the testing trap, wherein the total oil flow rate comprises a first oil flow rate in the liquid leg of the testing trap and a second oil rate in the gas leg of the testing trap;
comparing the total gas flow rate and the total oil flow rate to a measured gas flow rate and a measured oil flow rate respectively, wherein the measured gas flow rate and the measured gas flow rate are measured by a multiphase flow meter; and
determining, based on the comparison, whether the multiphase flow meter is calibrated.

10. The one or more non-transitory computer-readable storage media of claim 9, wherein the testing trap comprises a gas Coriolis meter and a liquid Coriolis meter.

11. The one or more non-transitory computer-readable storage media of claim 9, wherein the first oil flow rate is calculated using:

$$Q_{OL} = \frac{(1 - G_{Lf})(\sigma_{Lm})}{\rho_{Lm}} \times \frac{(1 - WC)}{B_o(1 - WC) + B_w(WC)},$$

wherein $\sigma_{Lm}$ is a mass flow rate in the liquid leg at line conditions, $\rho_{Lm}$ is a density of a liquid part at line conditions, WC is a water cut fraction at standard conditions, $B_o$ is a formation volume factor of oil, $B_w$ is a formation volume factor of water, and $G_{Lf}$ is a dimensionless gas fraction in the liquid part at line conditions.

12. The one or more non-transitory computer-readable storage media of claim 9, wherein the second oil flow rate is calculated using:

$$Q_{OC} = \frac{\sigma_{gm} \times (1 - G_f)}{\rho_{gm} \times B_o},$$

wherein $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

13. The one or more non-transitory computer-readable storage media of claim 9, wherein the first gas flow rate is calculated using:

$$Q_{Lfg} = \frac{G_{Lf}(\sigma_{Lm})}{\rho_{Lm} B_g},$$

wherein $\sigma_{Lm}$ is a mass flow rate in the liquid leg at line conditions, $\rho_{Lm}$ is a density of a liquid part at line conditions, $B_g$ is a gas formation volume factor, and $G_{Lf}$ is a dimensionless gas fraction in the liquid part at line conditions.

14. The one or more non-transitory computer-readable storage media of claim 9, wherein the second gas flow rate is calculated using:

$$Q_{fg} = \frac{\sigma_{gm} \times G_f}{\rho_{gm} \times B_g},$$

wherein $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

15. The one or more non-transitory computer-readable storage media of claim 9, the operations further comprising:
generating a message indicating whether the multiphase flow meter is calibrated.

16. The one or more non-transitory computer-readable storage media of claim 9, wherein the total gas flow rate further comprises gas dissolved in the oil in the testing trap.

17. A system comprising:
one or more processors configured to perform operations comprising:
calculating a total gas flow rate in a testing trap, wherein the total gas flow rate comprises a first gas flow rate in a liquid leg of the testing trap and a second gas flow rate in a gas leg of the testing trap;

calculating a total oil flow rate in the testing trap, wherein the total oil flow rate comprises a first oil flow rate in the liquid leg of the testing trap and a second oil rate in the gas leg of the testing trap;

comparing the total gas flow rate and the total oil flow rate to a measured gas flow rate and a measured oil flow rate respectively, wherein the measured gas flow rate and the measured gas flow rate are measured by a multiphase flow meter; and determining, based on the comparison, whether the multiphase flow meter is calibrated.

18. The system of claim 17, wherein the testing trap comprises a gas Coriolis meter and a liquid Coriolis meter.

19. The system of claim 17, wherein the first oil flow rate is calculated using:

$$Q_{OL} = \frac{(1-G_{Lf})(\sigma_{Lm})}{\rho_{Lm}} \times \frac{(1-WC)}{B_o(1-WC)+B_w(WC)},$$

wherein $\sigma_{Lm}$ is a mass flow rate in the liquid leg at line conditions, $\rho_{Lm}$ is a density of a liquid part at line conditions, WC is a water cut fraction at standard conditions, $B_o$ is a formation volume factor of oil, $B_w$ is a formation volume factor of water, and $G_{Lf}$ is a dimensionless gas fraction in the liquid part at line conditions.

20. The system of claim 17, wherein the second oil flow rate is calculated using:

$$Q_{OC} = \frac{\sigma_{gm} \times (1-G_f)}{\rho_{gm} \times B_o},$$

wherein $\sigma_{Lm}$ is a mass flow rate in the gas leg at line conditions, $\rho_{gm}$ is a density of a gas part at line conditions, $B_o$ is a formation volume factor of oil, and $G_f$ is a dimensionless gas volume fraction.

* * * * *

UNITED STATES PATENT AND TRADEMARK OFFICE
CERTIFICATE OF CORRECTION

| | | |
|---|---|---|
| PATENT NO. | : 12,247,862 B2 | Page 1 of 1 |
| APPLICATION NO. | : 17/683006 | |
| DATED | : March 11, 2025 | |
| INVENTOR(S) | : Ammal F. Al-Anazi and Wenrong Mei | |

It is certified that error appears in the above-identified patent and that said Letters Patent is hereby corrected as shown below:

On the Title Page

In Column 2, Line 12, please replace "Nigera" with -- Nigeria --

In Column 2, Line 13, please replace "Annual" with -- Annual International --

In the Claims

In Column 18, Line 54, Claim 1, please replace "gas" with -- oil --

In Column 19, Line 64, Claim 9, please replace "gas" with -- oil --

In Column 21, Line 10, Claim 17, please replace "gas" with -- oil --

Signed and Sealed this
Twenty-second Day of April, 2025

Coke Morgan Stewart
*Acting Director of the United States Patent and Trademark Office*